US007156941B2

(12) United States Patent
Dumoux

(10) Patent No.: US 7,156,941 B2
(45) Date of Patent: Jan. 2, 2007

(54) METHOD FOR TRANSFERRING A COATING ONTO ARTICLES WITH WARPED SURFACES

(76) Inventor: Pierre Dumoux, 7 rue Sampaix, 71230 Saint-Vallier (FR)

( * ) Notice: Subject to any disclaimer, the term of this patent is extended or adjusted under 35 U.S.C. 154(b) by 0 days.

(21) Appl. No.: 10/531,328

(22) PCT Filed: Oct. 10, 2003

(86) PCT No.: PCT/FR03/02990

§ 371 (c)(1),
(2), (4) Date: Apr. 14, 2005

(87) PCT Pub. No.: WO2004/035325

PCT Pub. Date: Apr. 29, 2004

(65) Prior Publication Data

US 2005/0271822 A1 Dec. 8, 2005

(30) Foreign Application Priority Data

Oct. 15, 2002 (FR) .................................. 02 12780

(51) Int. Cl.

| | |
|---|---|
| ***B29C 65/00*** | (2006.01) |
| ***B32B 37/06*** | (2006.01) |
| ***B32B 37/14*** | (2006.01) |
| *B29C 65/18* | (2006.01) |
| *B29C 65/42* | (2006.01) |

(52) U.S. Cl. ...................... 156/247; 156/155; 427/146; 427/148; 264/313; 264/316

(58) Field of Classification Search ................ 156/155; 427/146, 148; 264/313, 316, 317
See application file for complete search history.

(56) References Cited

U.S. PATENT DOCUMENTS

| | | | | |
|---|---|---|---|---|
| 3,632,365 | A | 1/1972 | Gray | |
| 3,655,496 | A * | 4/1972 | Ettre et al. | 428/42.2 |
| 4,415,623 | A * | 11/1983 | Schlaepfer | 428/200 |

FOREIGN PATENT DOCUMENTS

| | | | |
|---|---|---|---|
| GB | 1 420 347 | A | 1/1976 |
| GB | 1 515 325 | A | 6/1978 |

* cited by examiner

*Primary Examiner*—Chris Fiorilla
*Assistant Examiner*—Sonya Mazumdar
(74) *Attorney, Agent, or Firm*—Birch, Stewart, Kolasch and Birch, LLP

(57) ABSTRACT

The method of transferring a coating onto articles having skew surfaces comprises the steps of applying a coating on the articles, which coating is carried by a transfer support that has a pyrolysis temperature lower than a melting temperature of the coating, the coating itself having a sealing temperature lower than the pyrolysis temperature of the transfer support, and then of subjecting articles coated in this way to the melting temperature of the coating.

1 Claim, No Drawings

METHOD FOR TRANSFERRING A COATING ONTO ARTICLES WITH WARPED SURFACES

CROSS REFERENCE TO RELATED APPLICATIONS

The present application is a national stage application under 35 U.S.C. 371 of International application PCT/FR03/02990 filed on Oct. 10, 2003, which claims priority to FR02/12780, filed on Oct. 15, 2002.

The present invention relates to a method of transferring a coating, in particular an enamel coating, onto articles having a skew surface.

BACKGROUND OF THE INVENTION

Document FR-A-2 281 833, in particular, discloses a method of coating articles, which method consists in depositing, on a vessel filled with water, a transfer sheet of water-soluble material carrying decoration made using inks for transfer onto the articles, in immersing the articles in the liquid after the transfer sheet has softened, in rinsing the articles to eliminate the residue of the transfer sheet, and, where appropriate, in subjecting the articles to a rise in temperature in order to cause the decoration that was transferred while the articles were immersed in the liquid to become fixed permanently on the articles.

That method raises problems when the coating presents low adhesion relative to the article, for example for an enamel coating on a porcelain article. Enamel does not adhere sufficiently to porcelain, and as a result during rinsing of the solution, the enamel is eliminated together with the transfer sheet, even when using an adhesion promoter.

Document FR-A-2 808 723 also discloses a method of enameling articles, which method consists initially in making the articles in a first mold, then in transferring the articles into a second mold after spraying enamel into the second mold. The method of making the decoration by spraying directly into the mold does not enable accurate decoration to be made suitable for application to skew surfaces of complex shape.

Documents U.S. Pat. No. 4,451,522 and GB-A-2 357 088 disclose methods of transferring enamel, which methods consist in initially spraying a water-soluble detachment layer onto a support film and then in printing enamel decoration so as to form a flexible film on the detachment layer. In use, the assembly is soaked in water in order to soften the attachment layer, and the enamel decoration is slid from the support sheet onto the article to be decorated like a decal, with the residue of the detachment layer coming into contact with the outside surface of the article and serving as adhesive for fixing the decoration on the article before firing the enamel. In order to be capable of being slid from the support film onto the article to be decorated, the decorative layer must have thickness suitable for constituting a film that remains sufficiently strong during transfer, and as a result this decorative layer has sufficient flexibility to be able to take up the shape of a surface that is curved slightly, but not sufficient flexibility to be capable of matching skew surfaces of complex shapes.

OBJECT OF THE INVENTION

An object of the invention is to propose a method enabling a coating to be applied on articles having skew surfaces, even when the coating presents low adhesion.

BRIEF SUMMARY OF THE INVENTION

According to the invention, the method of transferring a coating onto articles having skew surfaces comprises the steps of applying a coating on the articles, which coating is carried by a transfer support that has a pyrolysis temperature lower than a melting temperature of the coating, the coating itself having a sealing temperature lower than the pyrolysis temperature of the transfer support, and then of subjecting articles coated in this way to the melting temperature of the coating.

This makes it possible to make a coating as a layer that is very fine and capable of taking up any surface configuration of an article, with the transfer support serving to hold the coating on the article and being eliminated by pyrolysis immediately prior to the coating melting.

DETAILED DESCRIPTION OF THE INVENTION

In a first implementation of the invention, the coating to be transferred, e.g. a coating of enamel which has a melting temperature lying in the range 600° C. to 1300° C., approximately, and which might even be constituted merely by a single layer of uniform color, is printed by an electrostatic system (enamel toner), ink jet, silkscreen printing, by heliography, or by any other means onto a water-soluble film having a pyrolysis temperature lying in the range 300° C. to 400° C., approximately. The support film is pre-cut as a sheet and it is deposited on the top surface of a vessel filled with water. After the transfer sheet has softened, articles to be decorated are immersed in a bath thus causing the coating and the softened transfer support to come into intimate contact with the surfaces of the articles. The articles are then extracted from the transfer bath and placed directly without being rinsed in a firing enclosure in which they are raised to a melting temperature of the coating. As the temperature rises, the coating passes through a sealing temperature which is lower than the pyrolysis temperature of the transfer support (and than the melting temperature of the coating) and that is sufficient to enable the coating to be held in place on the article when the transfer support is subjected to pyrolysis. This sealing temperature corresponds either to a binder initially contained in the coating or added immediately prior to the coating being applied to the article either melting or firing, or else to the appearance of forces that are the result of heating the material forming the coating prior to the coating melting. When a binder is used, it may also be subjected to pyrolysis during melting of the coating. For a binder that itself has a pyrolysis temperature lower than the melting temperature of the coating, the binder can nevertheless keep the coating bonded in place, at least until the coating begins to melt, because of the temperature gradient inside the layer forming the coating, even when the articles are inserted into a kiln preheated to the melting temperature of the coating.

In a second implementation, an extensible support film is preprinted with a coating that is dried, and then the support film is cut out to match the outline of the bottom of a mold and it is placed in a mold where it is kept pressed against the bottom of the mold, e.g. by means of an electrostatic system or by suction, and then the material constituting the articles that are to be decorated is inserted into the mold, and after unmolding, the resulting article is sent directly to a kiln for firing which simultaneously fires the article, melts the enamel, and subjects the transfer support to pyrolysis.

In a variant of this implementation, the film is not pre-cut, but is advanced stepwise on each molding cycle, and the decorated portion for application to the article is cut from the film on closing the mold.

In a third implementation, the coating to be transferred is preprinted by means of an enamel solution on a heat-shrink film that is placed on the piece to be decorated, e.g. by ensuring that it is initially in tubular shape, and then the assembly is raised in temperature to a melting temperature of the enamel solution, thereby initially causing the heat-shrink film to shrink, and then causing it to be pyrolyzed simultaneously with the enamel solution melting.

In the three implementations described above, the enamel solution can be dried after printing in order to make it easier to handle the transfer support, it then being possible to reactivate the enamel solution immediately prior to transfer. The transfer support may also be fixed on a handling support, such as a sheet of paper, in order to further improve handling prior to the transfer operation proper.

The invention applies to coatings other than an enamel solution, for example a polymer coating for sealing an article made of porous material, or a coating for modifying surface characteristics (slip, adhesion, matt effect, feel, . . . ), the coating for application having a melting temperature higher than the pyrolysis temperature of the transfer support and a sealing temperature lower than the pyrolysis temperature of the transfer support.

It should be observed that in the method of the invention, the coating to be transferred is supported by the transfer support until the moment the coating melts, so it is possible to make a coating as a very thin layer which can fit accurately, even on shapes that present contours that are very complex.

In order to minimize the appearance of defects during pyrolysis of the transfer support, it is possible, where necessary, to eliminate the transfer support in part prior to subjecting the articles to a rise in temperature. Under such circumstances, the portion of the transfer support that is not eliminated is designed so as to ensure that the coating is held in place, given the nature of the transfer support. By way of example, for an enamel solution initially supported by a water-soluble film having a thickness of 40 micrometers (μm), it is possible, after immersion, to perform partial rinsing so as to reduce the thickness of the film that remains to about 5 μm. The remaining portion of the film is eliminated by pyrolysis during the rise in temperature.

Although it is mentioned in the second implementation of the invention that the article is made by inserting the material from which the article is made into the mold, it is possible to make such articles separately and then insert them into the mold, which then serves solely for the purpose of applying the coating on the articles.

Naturally, the invention is not limited to the implementations described, and various implementations can be devised without going beyond the ambit of the invention as defined by the claims. In particular, the material constituting the transfer support can be adapted to the selected method of transfer.

The invention claimed is:

1. A method of transferring a coating onto articles having skew surfaces, the method comprising the steps of applying a coating on the articles, which coating is carried by a transfer support that has a pyrolysis temperature lower than a melting temperature of the coating, the coating itself having a sealing temperature lower than the pyrolysis temperature of the transfer support, and then of subjecting articles coated in this way to the melting temperatures of the coating, wherein the transfer support is partially withdrawn prior to subjecting the articles to a rise in temperature.

* * * * *